United States Patent
Schönning

(10) Patent No.: US 6,691,875 B1
(45) Date of Patent: Feb. 17, 2004

(54) OPTICAL DISK STORAGE UNIT/CD RACK

(75) Inventor: Carl Jonas Peter Schönning, Orlando, FL (US)

(73) Assignee: Ployhistor International, Inc., Orlando, FL (US)

( * ) Notice: Subject to any disclaimer, the term of this patent is extended or adjusted under 35 U.S.C. 154(b) by 0 days.

(21) Appl. No.: 10/078,689

(22) Filed: Feb. 19, 2002

(51) Int. Cl.⁷ .......................... A47G 29/00; B65D 85/57
(52) U.S. Cl. .................... 211/40; 211/205; 211/168; 312/9.58; 206/308.1
(58) Field of Search ...................... 211/40, 205, 163, 211/121; 206/308.1, 308

(56) References Cited

U.S. PATENT DOCUMENTS

| | | | | |
|---|---|---|---|---|
| 845,739 A | * | 3/1907 | Alson | 211/33 |
| 1,004,281 A | | 9/1911 | Kuhn | |
| 1,409,392 A | * | 3/1922 | Morgan | 211/40 |
| 2,076,255 A | * | 4/1937 | Smythe, Jr. | 211/40 |
| 2,633,997 A | | 4/1953 | Johnson | 211/96 |
| 3,498,471 A | * | 3/1970 | Dirkx | 211/131.1 |
| 4,311,237 A | * | 1/1982 | Hayes | 206/503 |
| 4,515,420 A | * | 5/1985 | Grosch | 312/9.59 |
| 4,560,078 A | | 12/1985 | Dubuisson | 220/4 |
| 4,815,483 A | * | 3/1989 | DuGrenier et al. | 132/295 |
| 5,099,995 A | * | 3/1992 | Karakane et al. | 206/308.1 |
| 5,344,028 A | | 9/1994 | Angele | 211/40 |
| 5,423,434 A | | 6/1995 | Chen | 211/40 |
| 5,439,119 A | | 8/1995 | Chow | 211/49.1 |
| 5,697,684 A | | 12/1997 | Gyovai | 312/9.46 |
| 5,775,491 A | * | 7/1998 | Taniyama | 206/308.1 |
| 5,813,740 A | * | 9/1998 | Chang | 312/223.2 |
| 5,848,688 A | | 12/1998 | Paloheimo | 206/308.1 |
| 5,857,575 A | | 1/1999 | Watson et al. | 211/40 |
| 5,931,315 A | | 8/1999 | Lorentz et al. | 211/40 |
| 6,145,515 A | * | 11/2000 | Wu | 132/295 |
| 6,164,445 A | | 12/2000 | Cooper | 206/308.1 |
| 6,241,108 B1 | * | 6/2001 | Nakatani et al. | 211/187 |
| 6,502,703 B2 | * | 1/2003 | Scherer et al. | 211/40 |

* cited by examiner

Primary Examiner—Daniel P. Stodola
Assistant Examiner—Khoa Tran
(74) Attorney, Agent, or Firm—Brian S. Steinberger; Law Offices of Brian S. Steinberger, P.A.

(57) ABSTRACT

A rack unit for stacking storage medium disks such as compact disks (CDs) in a stacked cylindrical arrangement attached by arms to a vertical post attached to an enlarged base support. The cylindrical arrangement is oriented to be off-center in relation to the base support. The unit includes substantially planar and flat narrow support arms for holding and supporting the disks, so that the disks can be closely stacked to one another. The arms can include flat and planar clip ends thicker than the rest of the arms for snapably attaching about vertical post, where a step edge allows for an exterior edge of the disk to abut against it. The narrow support ends can include a wider substantially flat and planar support surface having an upwardly protruding and flexible hub portion which can snugly fit within the through-holes of the disks. The rack allows for anyone of the stacked CDs and anyone of the stacked narrow arms to be disengaged from the vertical post without having to remove either or both the CDs and the arms stacked above them. The posts can be extended and shortened by having each longitudinal post member having male and female connector ends for allowing easy, quick and sturdy assembly.

10 Claims, 14 Drawing Sheets

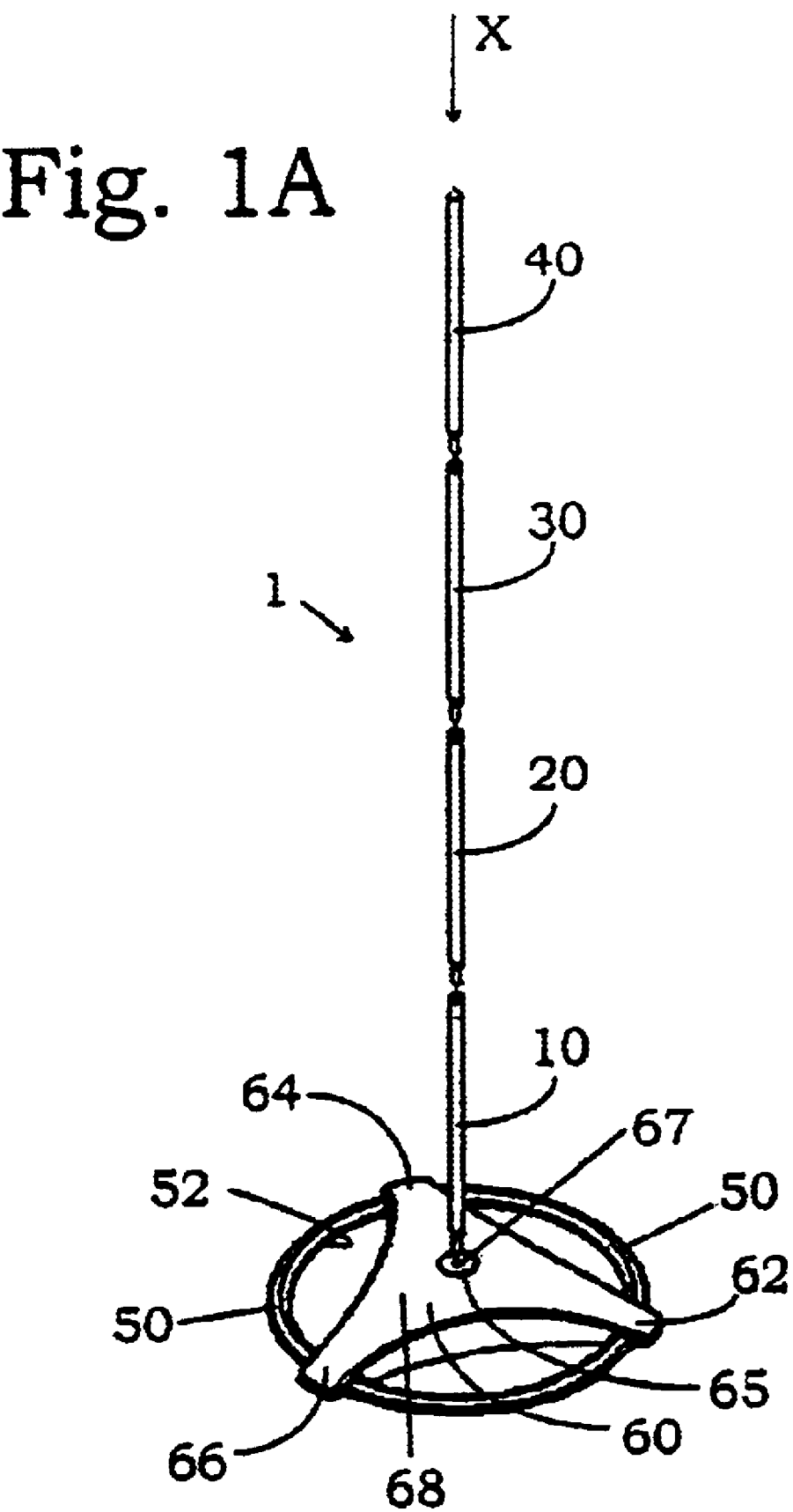

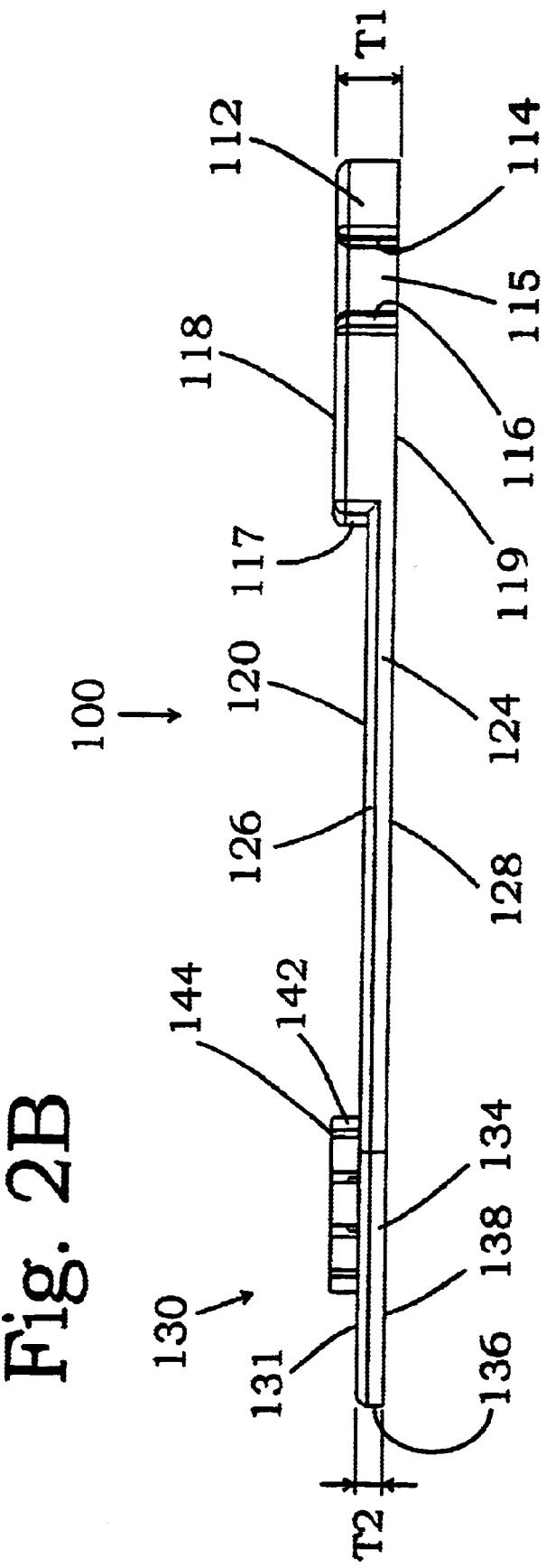

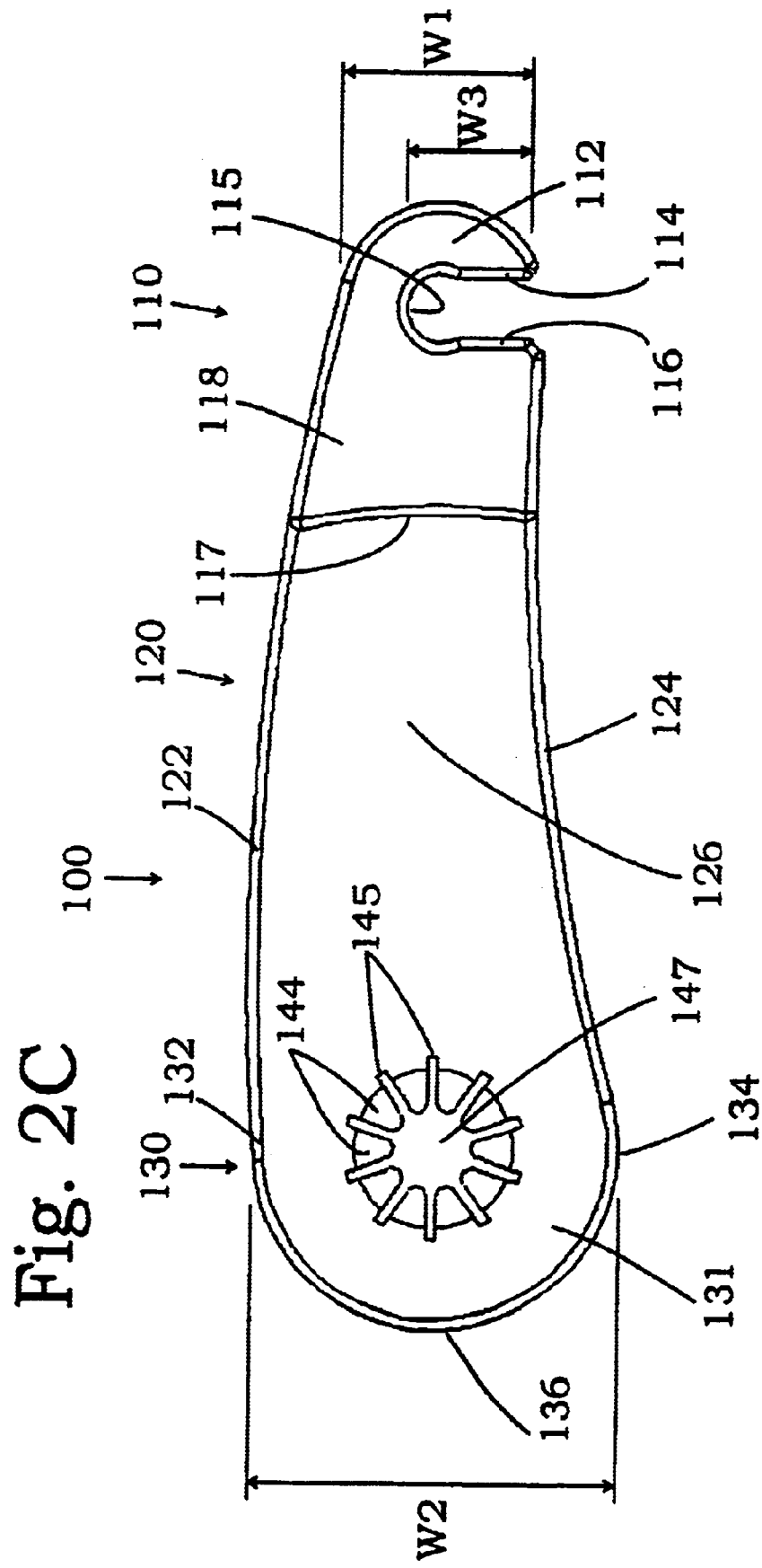

OPTICAL DISK STORAGE UNIT/CD RACK

BACKGROUND AND PRIOR ART

Compact disks (CDs) have become more and more popular in recent years for the storage of music and software. Often music listeners purchase many CDs for their collections which can number up to a dozen or more CDs. These CDs are generally are sold in individual rectangular cases, which are larger than the CDs themselves. Stacking rectangular cases can create loose piles that easily do not stay together.

Devices have been proposed over the years for storing rectangular CD cases. See for example, U.S. Pat. Nos. 5,344,028 to Angele; 5,423,434 to Chen; 5,439,119 to Chow.

However, the Angel, Chen and Chow devices will only work if you have uniform rectangular cases for the CDs. A loose CD cannot be used with this device. Furthermore, the stacking clips have a closed loop mounting ring which can cause difficulty if a clip has to be removed from within a stack of clips (for example, a broken clip that needs to be replaced). Thus, removing a clip in the middle of a stack of clips would require the user have to physically remove all the clips above in order to reach the clip to be removed. Furthermore, the space needed for storing the actual CD cases would be larger than the actual CDs themselves, requiring extra storage for just storing the cases.

U.S. Pat. No. 5,931,315 to Lorentz et al. describes a "modular storage and display device", title, that also requires using the actual CD cases to be used for storage. In addition to requiring extra space for storing the CD cases which are larger than the CDs themselves, there are other drawbacks to this device. Lorentz requires that all their connecting members require a "system for gripping an edge portion of the container itself", abstract, where these protruding edge gripping members can potentially break off over time. Still furthermore, the protruding edge gripping members would be disadvantageous if used to grip about CDs Other devices have been proposed for storing CDs without their cases. See for example, U.S. Pat. No. 5,697,684 to Gyovai. However, similar to the Angel, Chen and Chow described above, Gyovai requires the stacking clips having a closed loop type mounting ring which can cause difficulty if a clip has to be removed from within a stack of clips (for example, a broken clip that needs to be replaced). Thus, removing a clip in the middle of a stack of clips would require the user have to physically remove all the clips above in order to reach the clip to be removed. Furthermore, Gyovai requires plastic leaf supports that are larger and wider than the CDs themselves, and requires protruding pieces such as extending tabs that can potentially break off during use.

SUMMARY OF THE INVENTION

A primary object of this invention is to provide method and device for storing optical storage mediums such as compact disks(CDs) without requiring individual containers/cases for each CD.

A secondary object of this invention is to provide a method and device for storing optical storage mediums such as compact disks(CDs) having support arms that can be easily attachable and detachable without having to remove other support arms.

A third object of this invention is to provide a method and device for storing optical storage mediums such as compact disks(CDs) which support underneath the CDs, and do not require clips to grip about edges of the CDs.

A fourth object of this invention is to provide a method and device for storing optical storage mediums such as compact disks(CDs) having support arms for holding CDs having a smaller width than the CDs themselves.

A fifth object of this invention is to provide a method and device for storing optical storage mediums such as compact disks(CDs) that can store and stack CDs in a vertical configuration off-axis to a base support stand.

A preferred embodiment of the subject invention includes a novel stacking unit and method of assembling and disassembling the stacking unit that can store optical storage medium disks such as compact disks(CDs), and the like, and can include a base portion on a surface, a post that extends above and is supported in a vertical direction by the base portion, and a substantially flat longitudinal support arm having a substantially flat clip end which clips about a portion of the post, and a substantially flat support end that supports optical storage medium disk. The base portion can have a diameter that is greater than the diameter of the optical storage medium disk being supported by the support arm.

Each of the posts can include male and female connectors for connecting separate post portions together. The separate post portions can each include a longitudinal post portion having a first end with a socket opening, and a second end opposite to the first end with a protruding stem, wherein each protruding stem is sized to tightly fit within each socket opening. The protruding stem can have an enlarged step-out base, wherein the socket opening includes an enlarged opening portion for receiving the step-out base, and a narrow opening portion for receiving the protruding stem.

The clip end of the substantially flat planar support arm can have an end portion being slightly thicker than a mid portion of the substantially planar support arm, where the thicker end portion can have an edge which substantially abuts against an exterior edge of the disk being supported by the arm.

The support end of each arm can have an enlarged width substantially flat portion and an upwardly protruding holder for passing through a mid-opening in the disk. The upwardly protruding holders can be formed form separate flexible bent edges facing one another. Each of the arms can have a first longitudinal length between the support end and a portion of arm adjacent to the clip end, the first longitudinal length having a first width, wherein the first longitudinal length is approximately half the diameter of the disk being supported, and the first width of the support arm does not extend out from underneath the disk.

The novel method and arrangement for stacking plural arms and CD type disks can include plural substantially flat support arms each with clip ends and support ends, where the clip ends are pivotally attached about the post about the substantially flat support arm, wherein the support arm is removable from post without having to remove the plural support arms.

Further objects and advantages of this invention will be apparent from the following detailed description of a presently preferred embodiment which is illustrated schematically in the accompanying drawings.

BRIEF DESCRIPTION OF THE FIGURES

FIG. 1A is an exploded view of a vertical post separated from a stand base that is used with the novel rack.

FIG. 2B is a side view of the support arm of FIG. 2A along arrow 2B.

FIG. 2C is a bottom view of the support arm of FIG. 2A along arrow 2C.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1B:
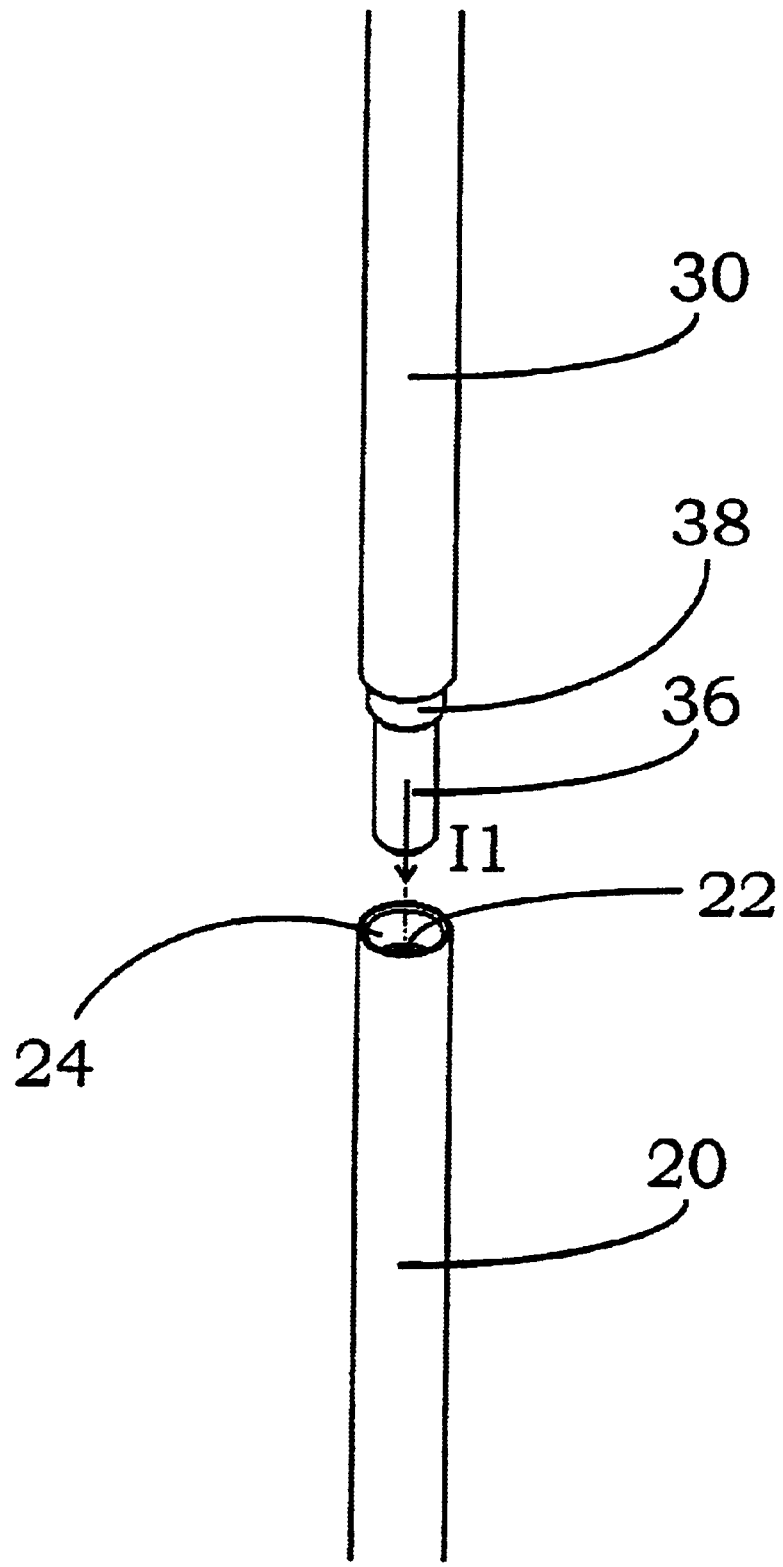
FIG. 1B is an enlarged view of the separated vertical post of FIG. 1A.

FIG. 1A is an exploded view of a separated vertical post members 10, 20, 30, 40 of a post 1, separated from a stand base 50, 60 that is used with the novel rack invention. FIG. 1B is an enlarged view of the separated vertical post members 20, 30 of FIG. 1A.

Referring to FIGS. 1A–1B, each of the elongated longitudinal vertical post members 10, 20, 30, 40 can be selectively interconnected together with one another to extend or reduce the height of the overall post 1. Each post member 10, 20, 30, 40 can include a protruding tip end portion 36 with an enlarged base portion 38 that mateably fits into a wide opening end portion 24 and narrow deeper opening portion 22 so that each post member has opposite facing male and female type end connectors.

Below the vertical post 1, can be a base support 50, 60 that can have an enlarged exterior ring portion 54 about a second interior ring 52 that can attach to feet portions 62, 64, 66 of a central base 60 that can have a wider central portion 68, that can be triangular shaped, have other geometrical type shapes, and the like. In the middle of the central portion 68 can be a wide opening through-hole 65 similar in size to wide opening portion 24, and a deeper narrow opening portion 67 similar in size to narrow deeper opening portion 22 previously described so that any one of the longitudinal post members 10, 20, 30, 40 can fit into and by supported in a vertical position by the base support 50, 60.

Figure 2A:
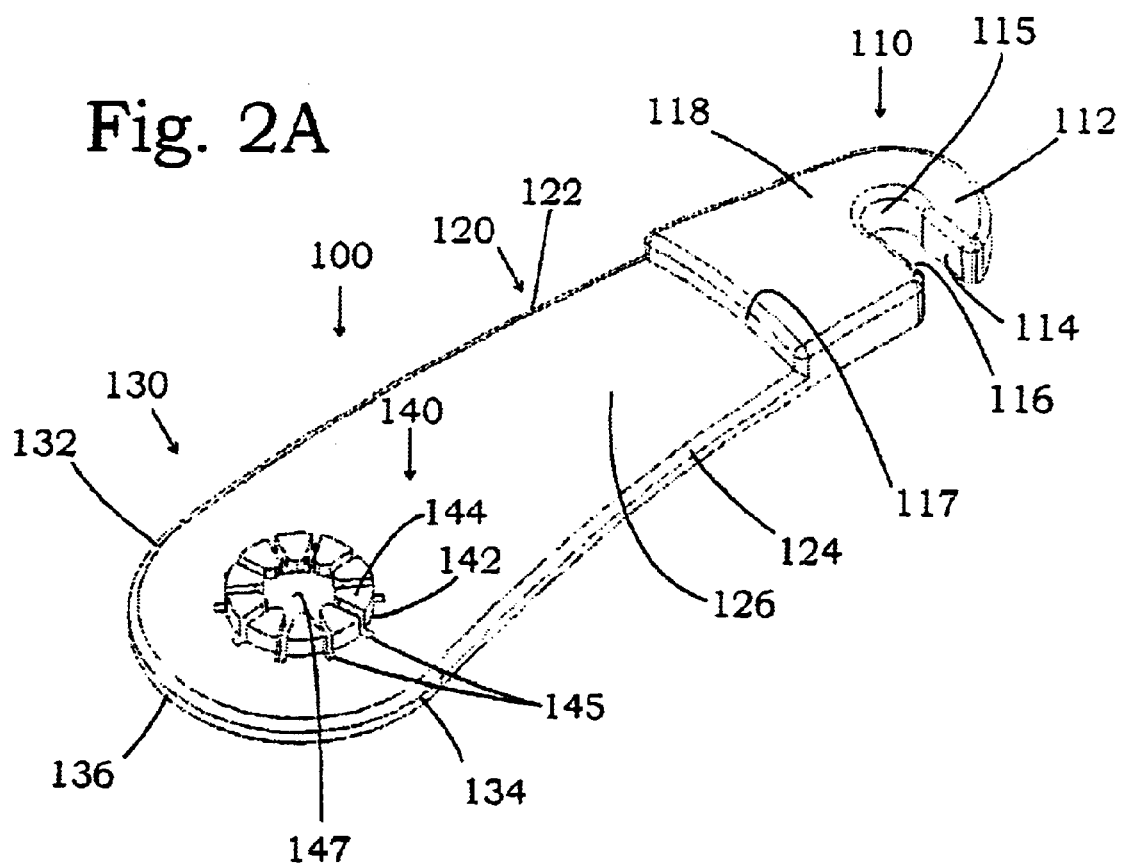
FIG. 2A is a perspective view of a support arm for use with the post and base of FIG. 1A.

FIG. 2A is a perspective view of the support arm 100 for use with the post 1 and base support 50, 60 of FIG. 1A. FIG. 2B is a side view of the support arm 100 of FIG. 2A along arrow 2B. FIG. 2C is a bottom view of the support arm 100 of FIG. 2A along arrow 2C. Referring to FIGS. 2A–2C, each support arm 100 can have substantially planar clip end 110, a substantially planar narrow elongated longitudinal midsection 120, and a substantially planar support end 130.

The substantially planar clip end 110 can include a rounded edge substantially planar prong portion 112, with interior facing first edge 114, semi-circular through-hole portion 115, and interior facing second edge 116 which faces the interior facing first edge 114. The clip end 110 can have a thickness component T1 that is thicker than the substantially planar portions 120, 130 of the rest of the support arm as represented by thickness component T2. A raised edge 117 separates the clip end portion 110 from the longitudinal substantially planar mid-portion 120 of the arm 100. Clip end portion 110 can have substantially flat opposing faces 118, 119.

The longitudinal substantially planar mid-portion 120 of the arm 100 can include a width W1 adjacent to raised edge 117 that gradually widens out to the larger width component W2 about the support end 130 of the arm 100. A left side 122 of the mid-portion 120 can have a slightly convex curving side wall shape, and the right side 124 of the mid-portion 120 can have a slightly concave curving side wall shape. Mid-portion 120 can also have substantially flat opposing faces 126, 128.

Support end portion 130 can include a rounded exterior edge 136 of a partial circle having a diameter W2 from side 132 to side 134 which is larger in width than the rest of the width components W1, W3 of the support arm 100. Support end portion 130 can include a raised hub portion 140 that can be comprised of raised bent lip portions 142, 144 each separated by spaces 145 from one another, and which forms a through-hole opening 147 therethrough. Similar to the other portions, support end 130 can have substantially flat opposing faces 131, 138.

Figure 3:
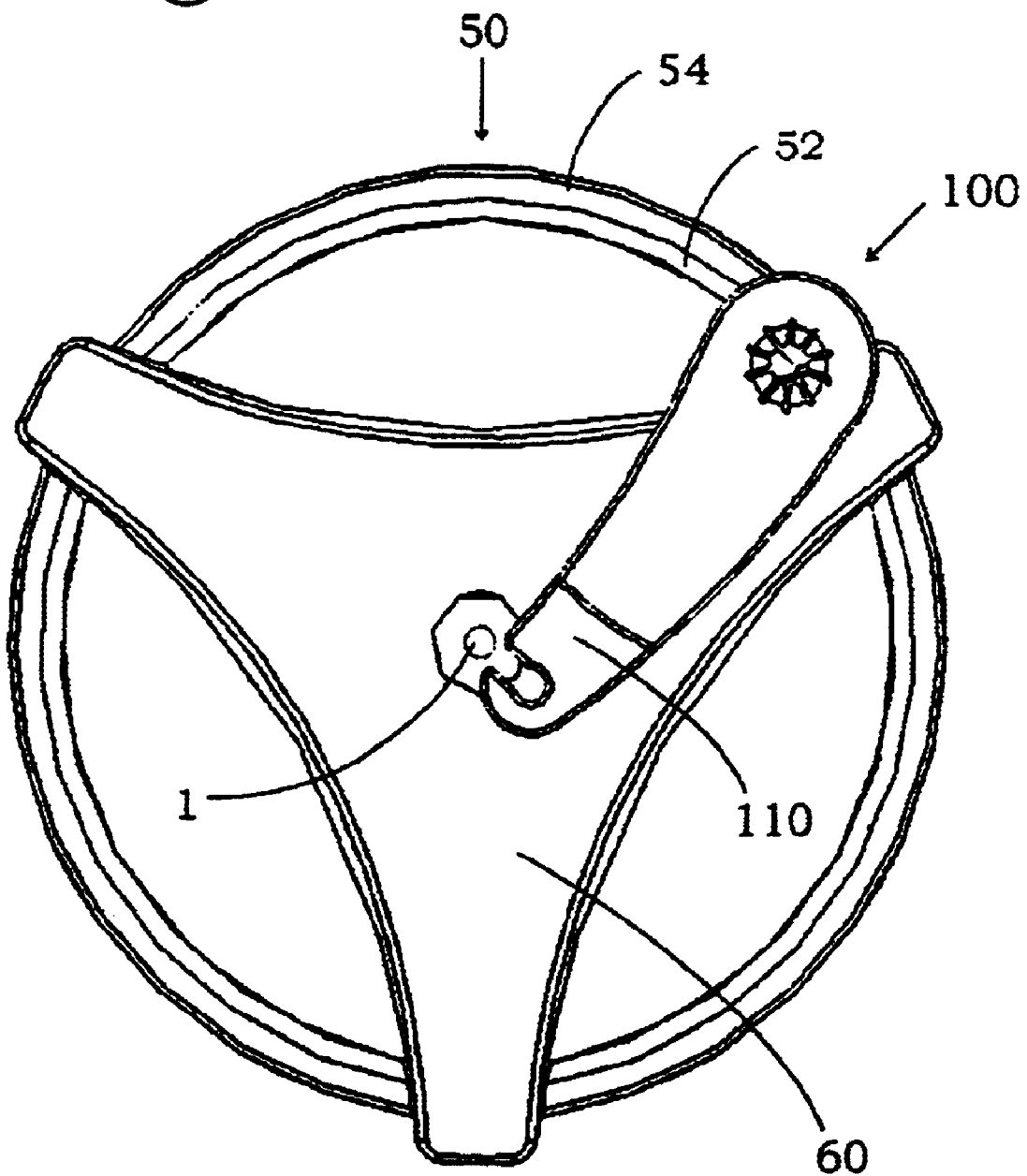
FIG. 3 is a top view of the post with stand base of FIG. 1A along arrow X, with the support arm of FIGS. 2A–2C about to be attached to the vertical post.
Figure 4:
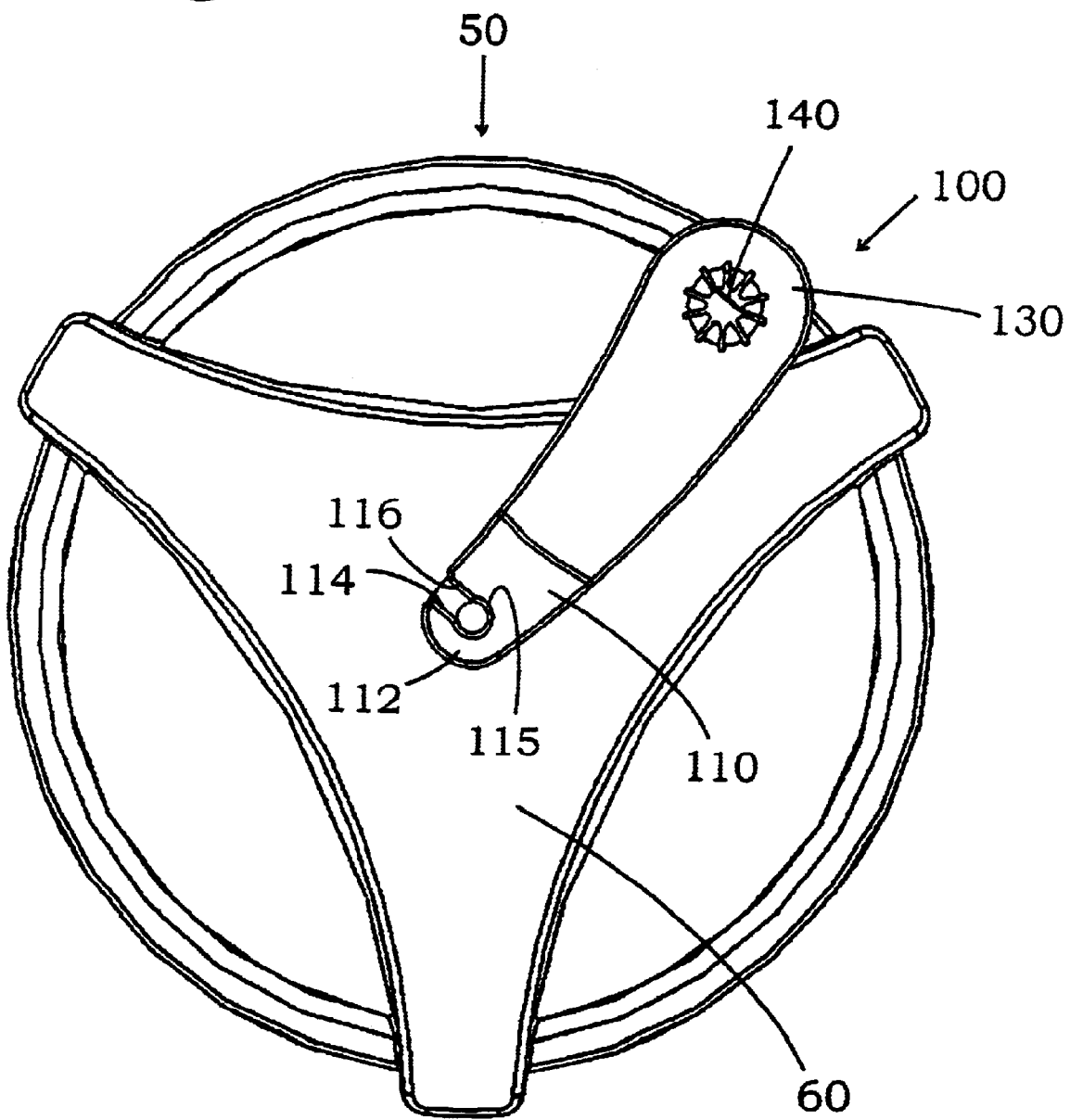
FIG. 4 is another view of FIG. 3 with the support arm attached to the vertical post.

FIG. 3 is a top view of the post 1 with stand base 50, 60 of FIG. 1A along arrow X, with the clip end portion 110 of the support arm 100 of FIGS. 2A–2C about to be attached to the vertical post 1. FIG. 4 is another view of FIG. 3 with the support arm 100 attached to the vertical post 1, wherein the interior facing edge 114 of the prong portion 112 which'snapably attaches with the second interior facing edge 116 so that the through-hole opening 115 wraps about the vertical post 1.

Figure 5:
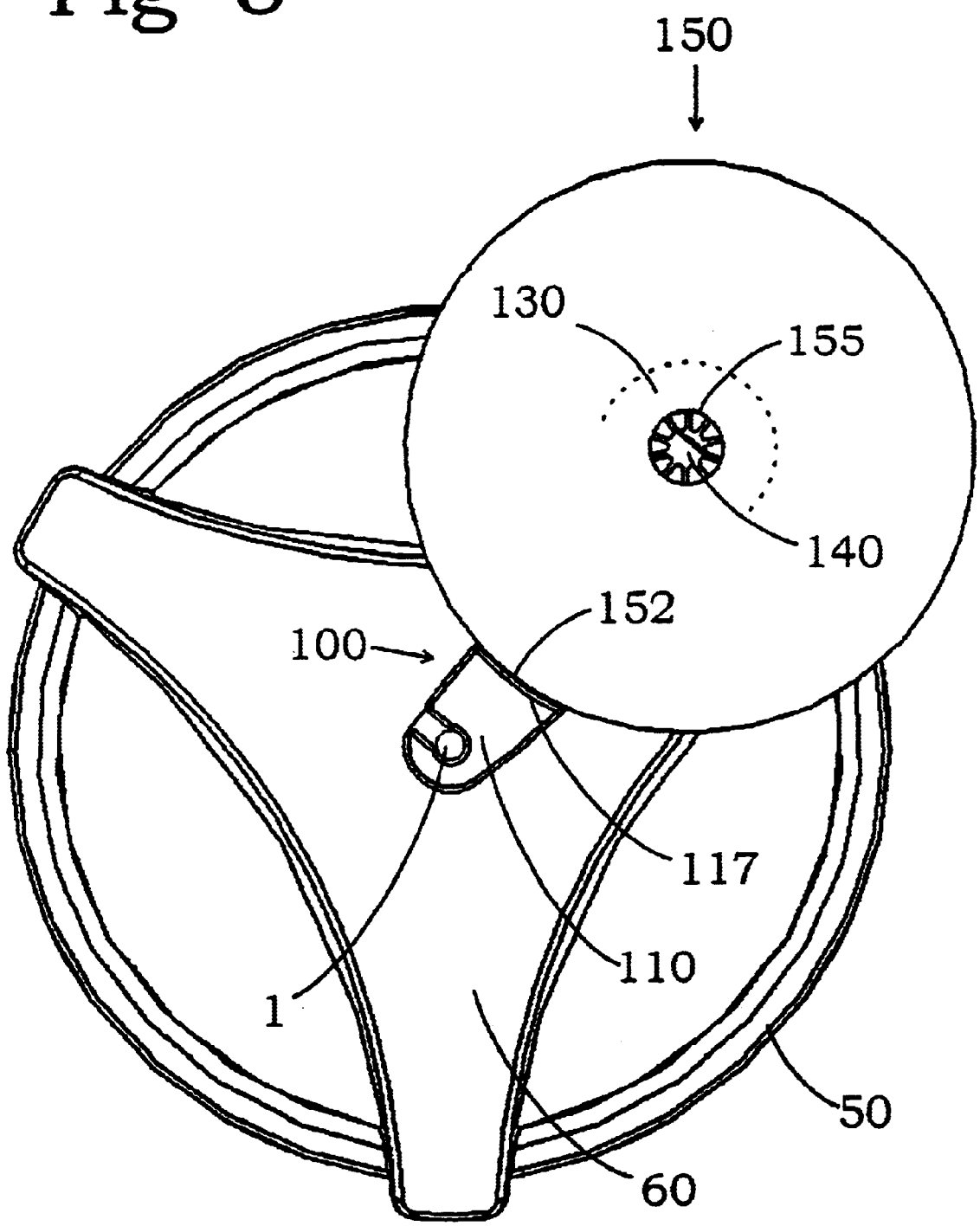
FIG. 5 is a view of FIG. 4 with a compact disk(CD) attached to and supported by the arm.

FIG. 5 is a view of FIG. 4 with an optic type storage medium disk 150, such as a compact disk(CD), and the like is attached to and supported by the arm 100 that is attached to the post 1. Here the outer edge 152 of disk 150 can abut against the raised edge 117 adjacent to the clip portion 110 of the arm 100. The raised edge 117 aids in initially attaching and holding the disk 150, and also restricts the movement of the disk 150 on the support arm 100 after it is stored on an individual arm 100. An existing circular through-hole 155 in the disk 150 can be positioned about the raised flexible hub portion 140 on the support end 130 of the support arm 100. The upwardly protruding bent raised bent lip portions 142, 144 can contract into the through-hole 155 of the disk 150 to snugly support and hold the disk 150 in a horizontal stable position on the arm, where the only portion of the support arm that extends from underneath the disk 150 is the clip end portion 110 of the support arm 100. As shown in FIG. 5, the disk 150 is stored off-axis from the vertical post 1, where the enlarged base 50, 60 which has a diameter larger than the disk 150 is able to stabilize the vertical post with the disk support arms 100 attached thereto.

Figure 6:
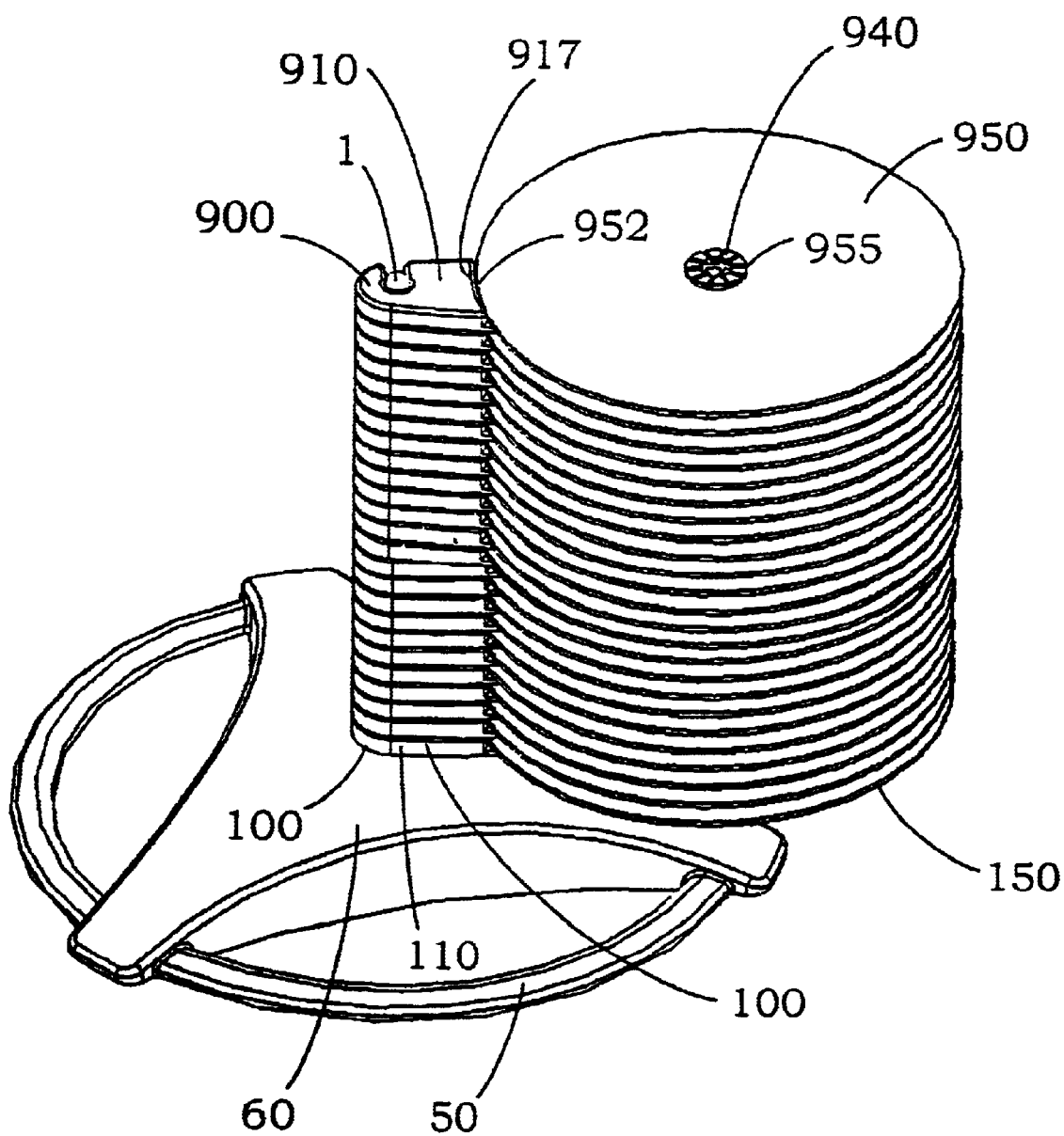
FIG. 6 is a perspective view of the novel rack of the preceding figures with a full pile of CDs stacked in place.

FIG. 6 is a perspective view of the novel rack invention of the preceding figures with a full pile of CDs 150–950 stacked in place in a cylindrical arrangement that is off-axis to the vertical post 1 that is attached to be base support 50, 60. As shown by the top disk 950, the outer exterior edge 952 abuts against the raise edge 917 of the clip end portion 910 of the top support arm 900. As previously described, the raised edge allows for an easier attachment of the disks when being stored, and restricts the movement of the disk on the support arm after it is stored on an individual arm. As clearly shown the thicker clip end portions 110–910 of each of the arms 100–900 allow the clip portions 110–910 of the arms 100–900 to be able to be easily closely stacked on top of one another.

Figure 7:
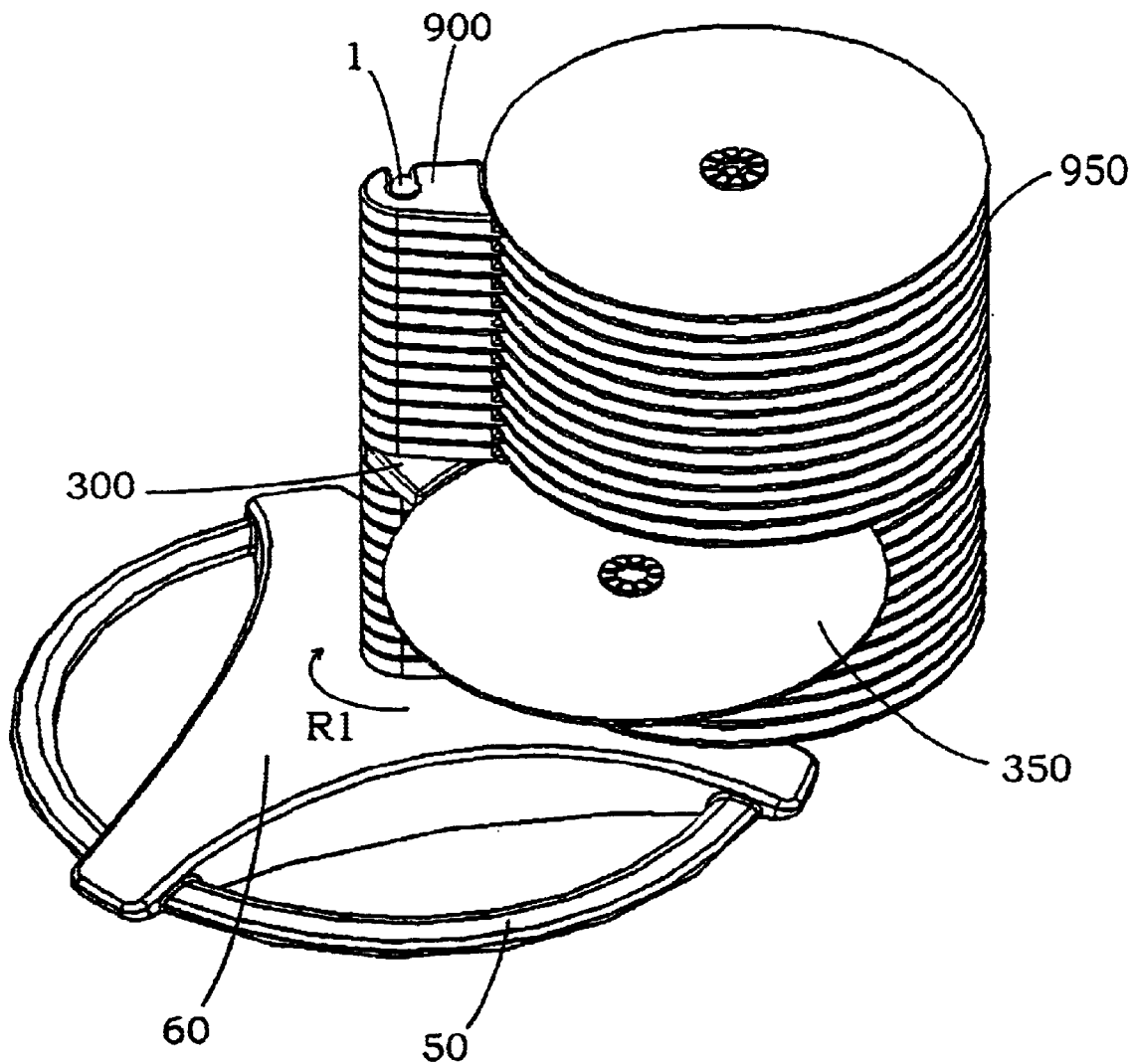
FIG. 7 is another view of the rack of FIG. 6 with a CD starting to be removed from the stacked rack.

FIG. 7 is another view of the rack of FIG. 6 with a single CD 350 starting to be removed from the stacked rack by being pivotally rotated in the direction of arrow R1 about the post 1 which forms an axis. With this invention anyone of the stacked CDs can be removed by gripping an outer edge of the disk and pivotally rotating the selected disk from out of the cylindrical stacked arrangement of disks.

Figure 8:
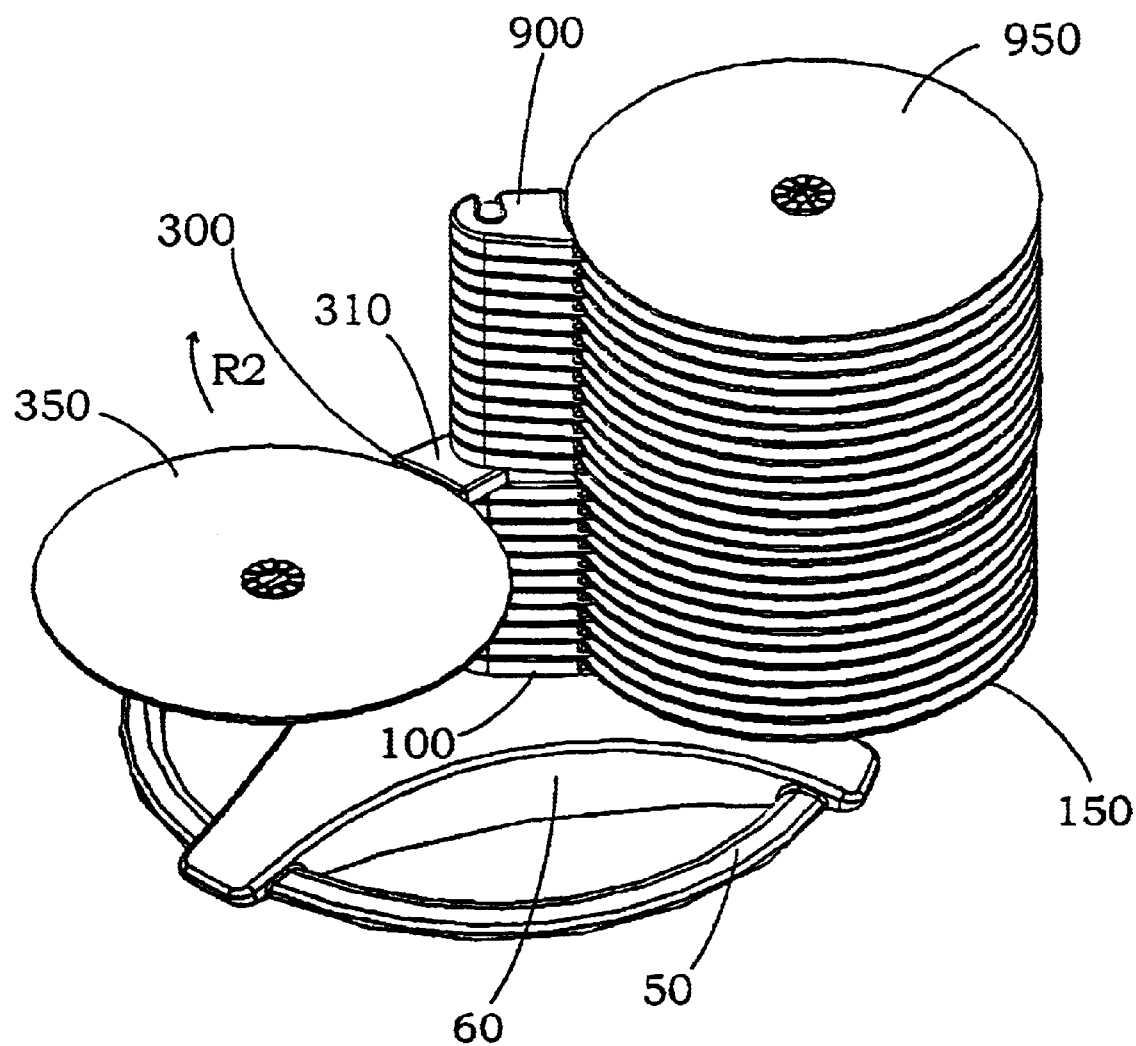
FIG. 8 is another view of the rack of FIGS. 6–7 with a CD on a support arm being fully removed from the stacked rack.

FIG. 8 is another view of the rack of FIGS. 6–7 with the CD 350 on the support arm 300 having been further pivotally rotated in the direction of arrow R2 so that the disk 350 is no longer within the stacked cylindrical rack.

Figure 9:
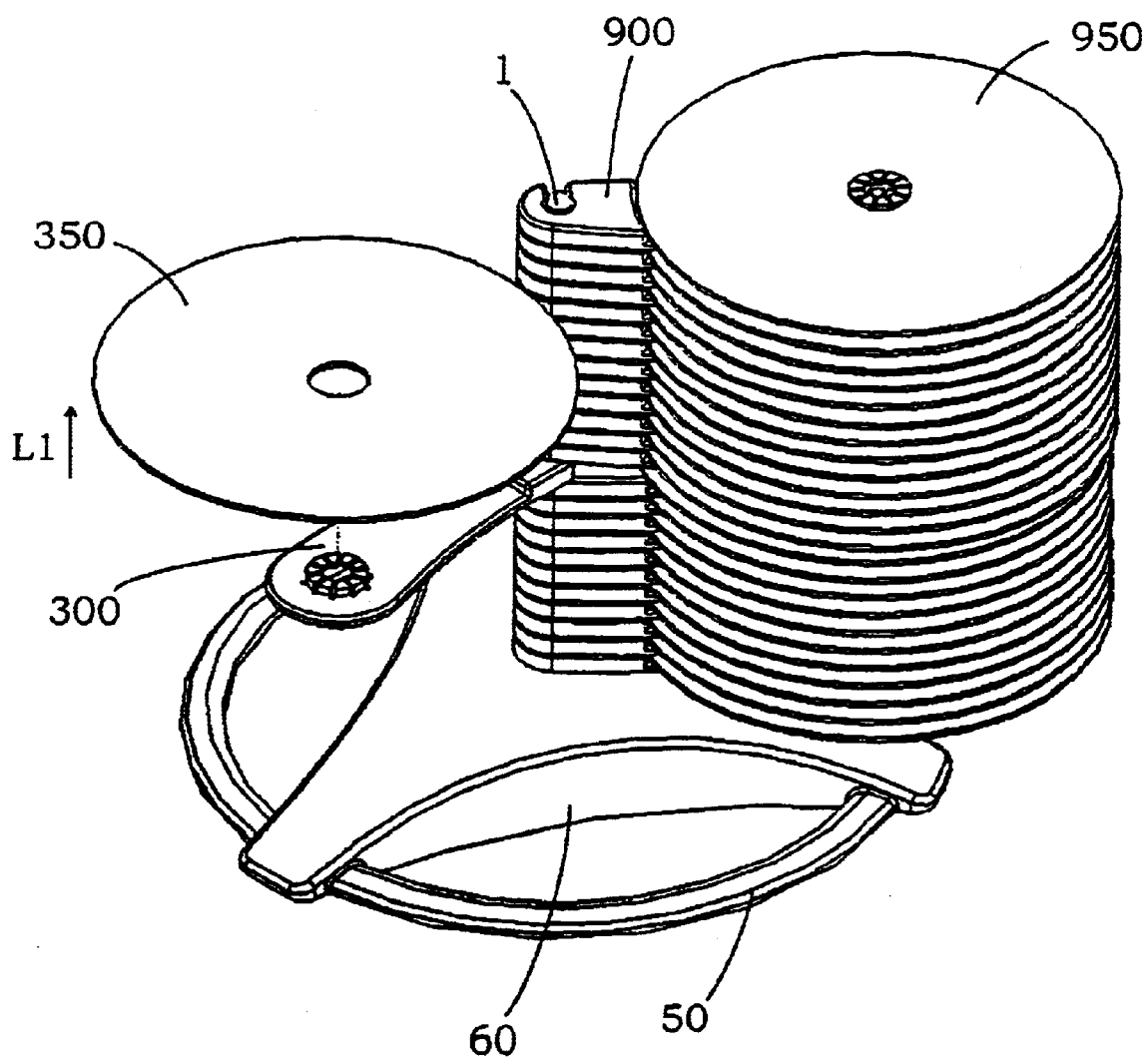
FIG. 9 is another view of the rack of FIGS. 6–8 with a CD being lifted from a support arm.

FIG. 9 is another view of the rack of FIGS. 6–8 with a CD being lifted in the direction of arrow L1 from a support arm 300. As shown any disk within a stack of disks can be removed from the disk without having to remove the disks above and/or below the disk selected to be removed.

Figure 10:
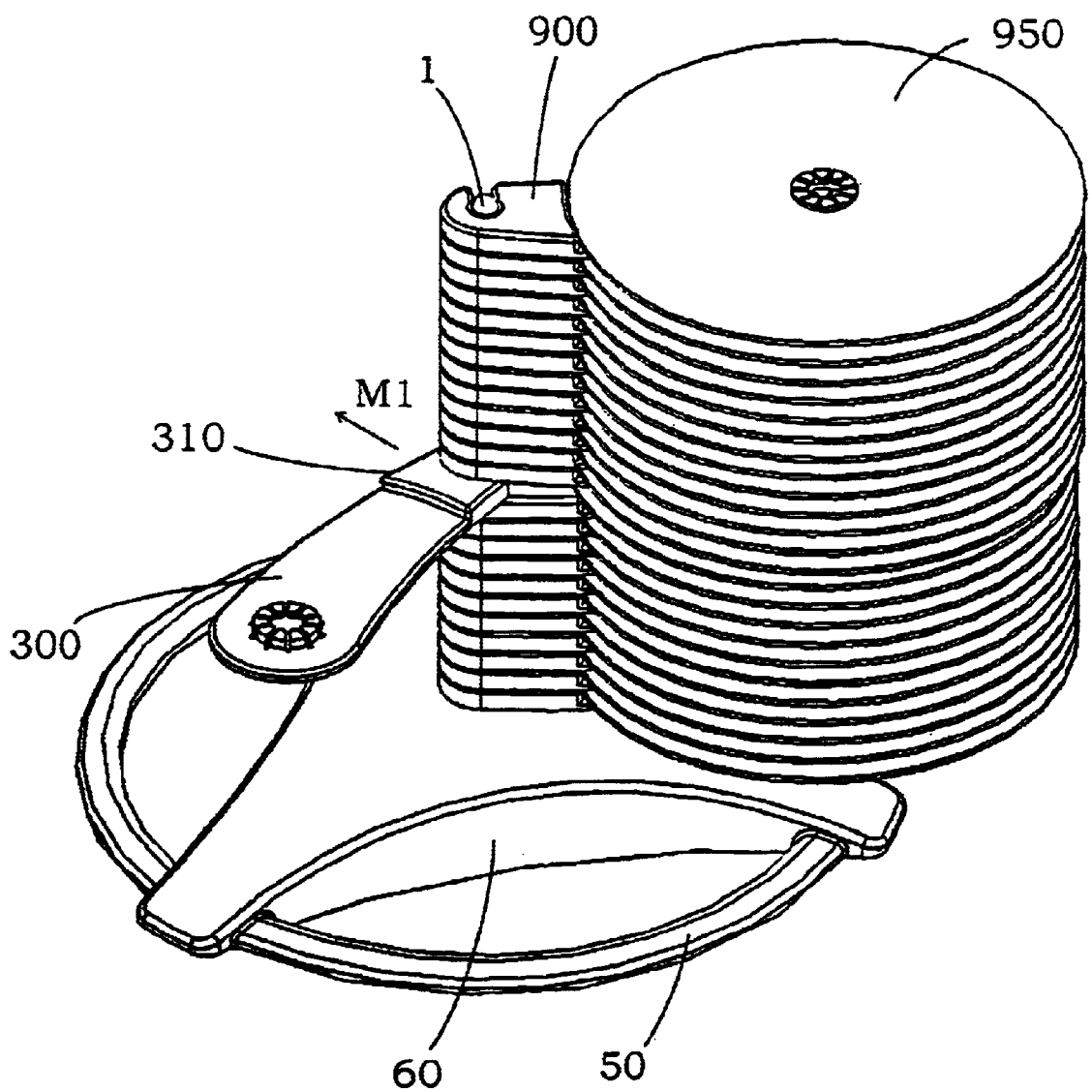
FIG. 10 is another view of the rack of FIGS. 6–9 with the support arm solely extending out from the stacked rack.

FIG. 10 is another view of the rack of FIGS. 6–9 with the support arm 300 solely extending out from the stacked cylindrical rack. Next, the clip end portion 310 can be pulled away from the post 1 by being moved in the direction of arrow M1, where the snapable portions(not shown) can separate from the post 1.

Figure 11:
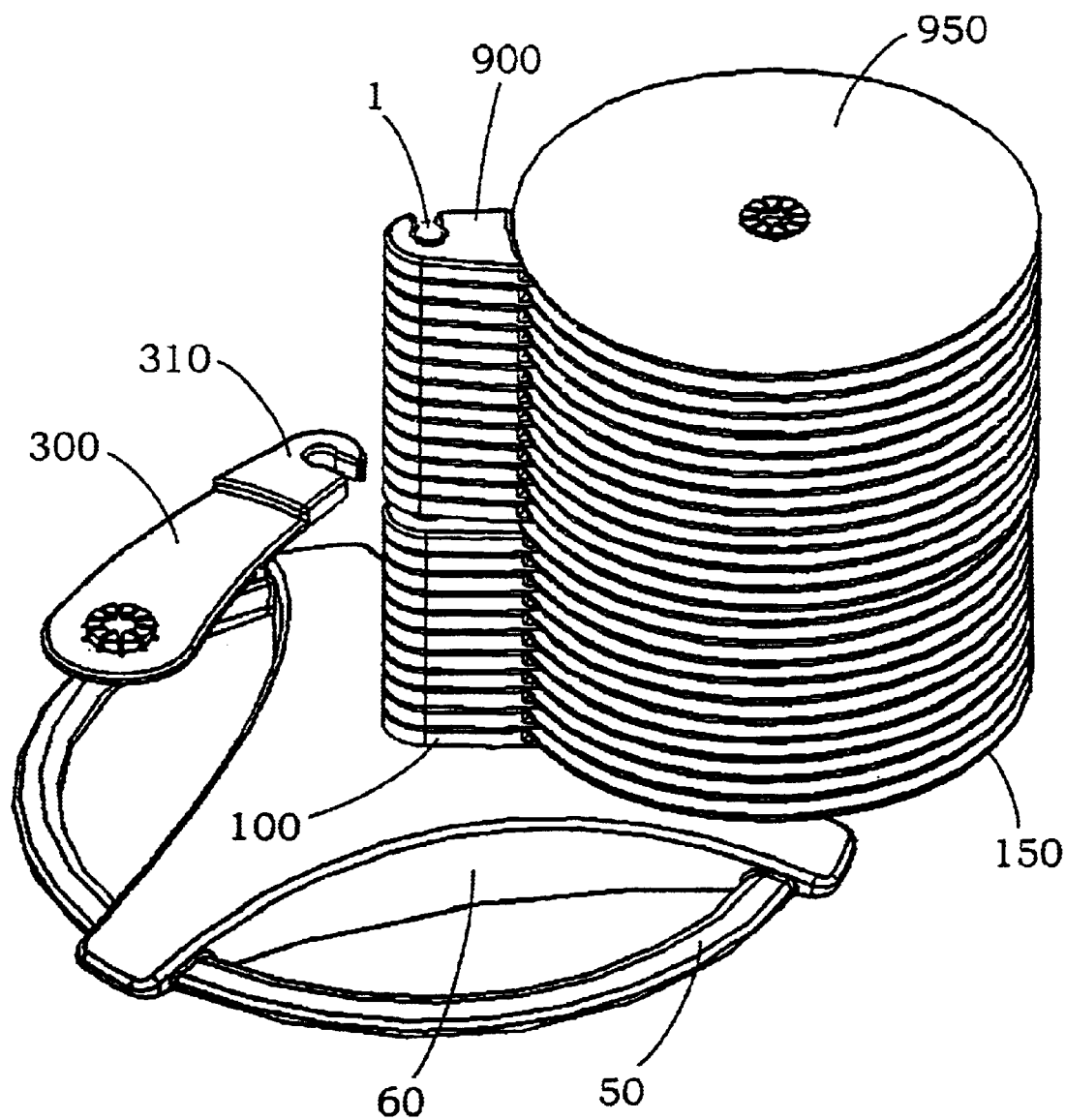
FIG. 11 is another view of the rack of FIGS. 6–10 showing the support arm being removed from the rack without having to remove any other CDs or support arms.

FIG. 11 is another view of the rack of FIGS. 6–10 showing the support arm 300 being removed from the rack without having to remove any other CDs or support arms either above or below the selected arm 300.

Although the posts are described as being connected together with male and female connector portions, the post sections can be attached to one another by being threadably rotated relative to one another.

While the base has been described as having a larger diameter than that of the disks being stored, the base can have a smaller diameter if it is extra weighted, and/or fastened to a support surface, and the like. For example, the posts can have their bottom edges mounted in a support surface, and/or the upper edge of the posts can be mounted, and/or both the upper and lower ends of the posts can be mounted.

All of the invention components can be easily disassembled from one another for storage of the components, and easy packaging of the components.

The components of the novel invention can be formed from injection molded plastic, metal, combinations thereof, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A storage rack for storing storage medium disks, comprising in combination:

a base portion on a surface;

a post that extends above and is supported in a vertical direction by the base portion; and a substantially flat longitudinal support arm having a substantially flat clip end with a side facing opening running perpendicular to a longitudinal axis of the support arm, which clips sideways to snap about a portion of the post, the clip end having a first thickness, and a substantially flat longitudinal support end that supports a storage medium circular disk, the longitudinal support end having a second thickness, wherein the first thickness of the clip end is greater than the second thickness of the longitudinal support end, the support arm being formed from plastic, the clip end having a concave curved stop edge that is adaptable for abutting against an exterior edge of the storage medium circular disk, the concave curved step edge being approximately perpendicular to the side facing opening in the clip end the flat longitudinal support arm having a first side with a concave edge and a second side with a convex edge opposite to the concave edge wherein the clip end includes a rounded outer curved arc shaped edge end having a first diameter, and the support arm includes an outer curved arc shaped edge end having a second diameter, the second diameter being greater than the first diameter, and the side facing opening in the clip end being substantially ninety degrees to a tip of the outer curved arc shape edge end of the clip end.

2. The storage rack of claim 1, wherein the post further includes:

male and female connector means for connecting two separate post portions together.

3. The storage rack of claim 2, wherein the male and female connector means includes:

a protruding stem and a socket opening.

4. The storage rack of claim 3, wherein the protruding stem includes:

an enlarged step-out base, wherein the socket opening includes an enlarged opening portion for receiving the stop-out base, and a narrow opening portion for receiving the protruding stem.

5. A method of storing storage medium circular disks in a stacked arrangement, comprising the steps of:

attaching a vertical support post above a base support;

clipping a side facing opening on an end of a first substantially planar and narrow support arm so that the arm clips sideways to snap about a first portion the vertical support post, the side facing opening running perpendicular to a longitudinal axis of the first support arm, the clip end having a first thickness, the arm having a substantially flat support end portion with a second thickness, the first thickness of the clip end being greater than the second thickness of the support end portion;

abutting an exterior edge of a first storage medium circular disk against a concaved curved step on the clip end of the first arm, wherein the concaved curved step portion is approximately perpendicular to the side facing opening on the clip end of the first arm;

supporting the first storage medium circular disk in a horizontal position directly on the substantially flat supporting the first arm; and providing the substantially planar and narrow support arm with a first side having a concave edge, and a second side having a convex edge opposite to the concave edge, wherein the clip end includes a rounded outer curved arc shaped edge end having a first diameter, and the support arm includes an outer curved arc shaped edge end having a second diameter, the second diameter being greater than the first diameter, and the side facing opening in the clip end being substantially ninety degrees to a tip of the outer curved arc shape edge end of the clip end.

6. The method of claim 5, wherein the step of supporting includes the step of:

passing an upwardly protruding hub portion from the support end portion of the first arm through a central opening in the first circular disk.

7. The method of claim 5, further comprising the step of:

clipping an end of a second substantially planar and narrow support arm about a first portion of the vertical post;

supporting a second storage medium disk in a horizontal position directly on a second substantially flat support end portion of the second support arm;

rotating the second arm with a second storage disk to be above the first arm with the first storage disk so that the first disk and the second disk are in a stacked cylindrical arrangement with one another.

8. The method of claim 7, further comprising the step of:

positioning the stacked cylindrical arrangement of the first disk and the second disk to be off-center relative to the base support for the rack.

9. The method of claim 7, further comprising the step of:

removing the first support arm front underneath the second support arm in the stacked cylindrical arrangement by pulling the second clip end sideways detaching the second clipping end from the post without having to pull an end of the second support arm away from the post.

10. The method of claim 5, further comprising the step of:

extending the post by stacking interconnecting male and female ends of at least two longitudinal post members on top of one another.

* * * * *

UNITED STATES PATENT AND TRADEMARK OFFICE
CERTIFICATE OF CORRECTION

PATENT NO. : 6,691,875 B1  Page 1 of 1
DATED : February 17, 2004
INVENTOR(S) : Carl Jonas Peter Schonning It is certified that error appears in the above-identified patent and that said Letters Patent is hereby corrected as shown below:

<u>Title page,</u>
Item [73], Assignee, should read -- Polyhistor International, Inc.
Orlando, FL (US) --.

Signed and Sealed this

Fourth Day of April, 2006

JON W. DUDAS
*Director of the United States Patent and Trademark Office*